Oct. 5, 1948.  W. G. SANDERS  2,450,693
PISTON ASSEMBLY AND RING
Filed Oct. 29, 1945

INVENTOR.
William G. Sanders
BY
ATTORNEY.

Patented Oct. 5, 1948

2,450,693

UNITED STATES PATENT OFFICE 2,450,693

PISTON ASSEMBLY AND RING

William G. Sanders, Houston, Tex.; Edna Sanders executrix of said William G. Sanders, deceased Application October 29, 1945, Serial No. 625,183

7 Claims. (Cl. 309—23)

This invention relates to piston assembly and ring for reciprocating pumps and more especially to pistons for slush pumps used in the drilling of wells by the rotary method in which fluid is circulated through the well by the pump in connection with the drilling operation.

As is well known, slush pumps used in connection with the drilling of wells are required to pump mud fluids through the well for the purposes, among others, of sealing the wall of the well, flushing the bit, and carrying the drill cuttings from the bottom to the top of the well. These cuttings frequently are very abrasive and under the very high pressures required for present day wells, which are drilled to depths of 10,000 to 15,000 feet, rapid wear and cutting out of the pump liner and piston parts frequently result. The result is that with the more conventional types of slush pump pistons, the piston parts must be frequently replaced and this is a time consuming and expensive operation.

The principal wearing effect is generally on the sealing members and the cylinder liners and when replacement of these parts becomes necessary it has frequently been required, due to the construction of the more conventional piston, to remove not only the piston body, but also the piston rod in order to permit replacement of the sealing members or the liner or both of them.

Also, since in the normal pump construction, the piston rod is tapered and the piston body is mounted thereon to provide a very tight connection between the rod and the body, the removal of the body from the pump generally requires that the rod and piston be removed from the cylinder, and the removal of the piston body from the rod requires considerable effort and time. Since the piston body is normally not subject to the same degree of wear as other parts of the piston, it has been found that much time and expense may be avoided by a design which will permit removal of the more rapidly wearing parts of the piston assembly without disturbing the piston body and rod.

Accordingly, the piston construction which is the subject of the present invention is designed to provide separable piston body and sealing elements in which the body is permitted to remain attached to the piston rod while the sealing members, as well as the liner, may be removed without disturbing the body or the rod.

The principal object of this invention, therefore, is to provide a form of piston which may be installed or removed from the pump with a minimum of labor and expense.

An important object of this invention is to provide a piston comprising separable body and sealing elements in which the sealing elements are removable from the body without removal of the latter from the piston rod.

Other objects are to provide a piston which will give improved performance under high-pressure with reduced wear of parts; and in which any member of the piston assembly may be easily removed or replaced at a minimum cost.

A further object of this invention is to provide a piston in which the sealing members are of a novel form and arrangement adapted to provide maximum sealing effect and reduced wear on the pump liners; and which are adapted to operate with minimum wear of the sealing members and associated portions of the piston assembly.

A more specific object is to provide a piston having separable body and sealing elements, the sealing elements being removable in whole, or in part, from the body without removal of the latter from the piston rod and without removal of the locking member normally holding the body on the rod.

Still another object is to provide a piston having separable body and sealing elements, the outside diameter of said body being greater than the outside diameter of the means for locking the body on a piston rod.

Other and more specific objects of the invention will be apparent from the following description when read in conjunction with the appended drawings in which.

Figure 1:
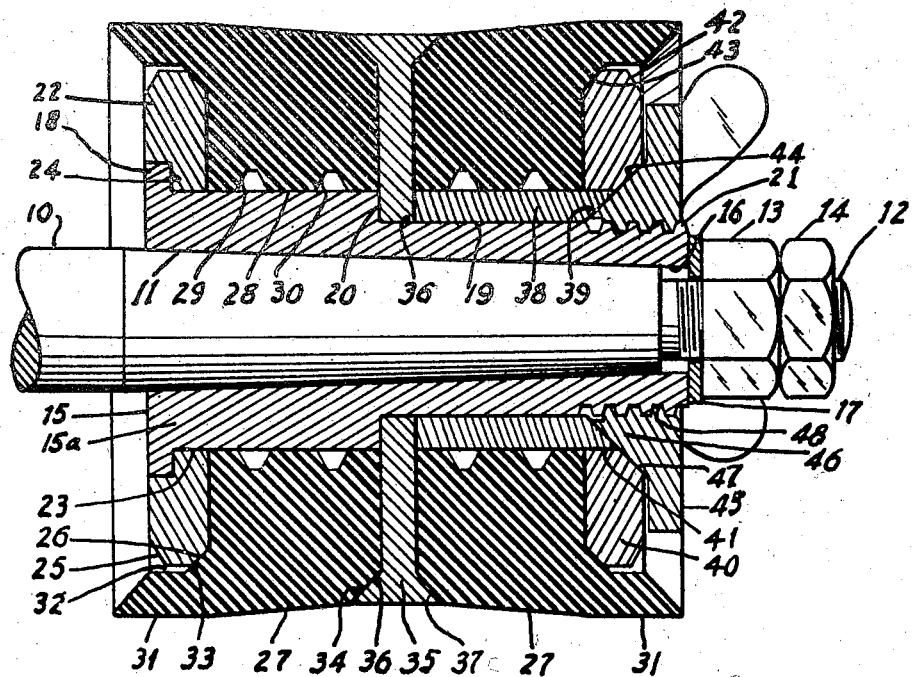
Fig. 1 is a sectional view of a piston in accordance with an embodiment of this invention.

It will be understoood that pistons of the type herein described are adapted to be operated in the cylinders of reciprocating pumps.

The piston is mounted on a piston rod 10, for reciprocation thereby. Piston rod 10 is provided with a tapered end portion 11, which has a reduced end threaded at 12 for the reception of the usual lock nuts 13 and 14. Mounted on the piston rod is a piston body 15, the bore 16 of which is tapered to complement the tapered end portion 11 of the piston rod. By means of this arrangement, a very tight fit of the piston body on the rod may be effected by the pressure of lock nuts 13 and 14. A washer 17 is positioned on the reduced end of the piston rod between the outer end of piston body 15 and the adjacent lock nut 13.

Figure 3:
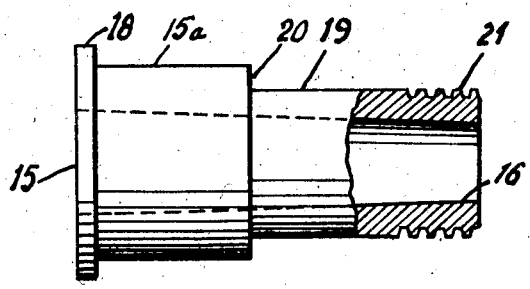
Fig. 3 is a detail, partly sectional, of the piston body.
Figure 2:
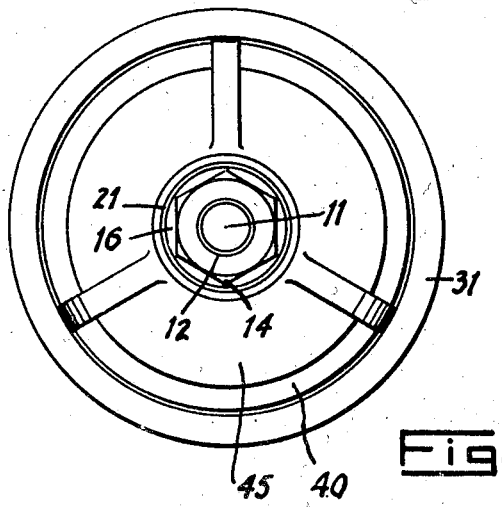
Fig. 2 is an end elevation of the piston shown in Fig. 1.

Piston body 15 is provided at its inner end with a peripheral flange 18 and has a portion 19 of reduced diameter (Fig. 3) extending from an intermediate point thereon to the opposite end forming a shoulder 20, intermediate the ends of the piston body, the larger portion of the piston body being designated 15a. The outer end of reduced portion 19 is provided with threads 21, which are of coarse type, such as "Acme" threads, for example. The outside diameter of piston body 15, at its smallest diameter, including threads 21, is greater than the outside diameters of lock nuts 13 and 14 and washer 17 in order that any of the other piston parts to be described hereinafter may be removed from the piston body without the necessity for removing the piston body or the lock nuts and washer from the piston rod.

The other parts of the piston assembly are all removably mounted on piston body 15 and will be described in the order in which they are normally assembled on the piston body. An annular end plate 22 has a central bore 23 of a size adapted to make a snug sliding fit with portion 15a of the piston body. A counterbore 24 in its outer face is adapted to snugly receive flange 18. The periphery of end plate 22 is scarfed on its outer and inner edges at 24 and 26, respectively. A resilient sealing member 27, constructed preferably of live rubber, but which may be of any suitable resilient or flexible composition, has a central bore 28 adapted to make a sliding fit over end portion 15a of the piston body and is provided with a pair of grooves 29 and 30 in the wall of bore 28. Sealing member 27 is provided with an outwardly extending peripheral lip 31 which extends over, and is concentric with, the peripheral edge of end plate 22. The thickness of lip 31 is such relative to the outer diameter of end plate 22 as to provide an annular space 32 between the inner face of the lip and the periphery of end plate 22. The juncture of lip 31 with the body of sealing member 27 is tapered at 33 to complement the adjacent chamfered edge 26 of end plate 22. The outer peripheral edge of the heel of sealing member 27 is chamfered at 34.

An annular reinforcing plate 35 has a central bore 36, the diameter of which is such as to make a snug sliding fit over reduced portion 19 of piston body 15. Reinforcing plate 35 will thus abut against shoulder 20 when assembled on the piston body. The outer periphery of reinforcing plate 35 is provided with outwardly extending peripheral flanges 36 and 37, the inner faces of which taper outwardly from the adjacent faces of the plate. The taper being such as to complement the chamfered edge 34 of sealing member 27.

A cylindrical sleeve 38 is mounted on reduced portion 19 of the piston body abutting reinforcing plate 35. The inner diameter of sleeve 38 is such as to provide a snug sliding fit on reduced portion 19 and the outer diameter of the sleeve is the same as that of the portion 15a of the piston body. A second sealing member 27, identical in size and form with that previously described, is mounted on sleeve 38 abutting reinforcing plate 35 but facing in the opposite direction to the sealing member first described. Sleeve 38 is of such length as to extend somewhat beyond the body of the sealing member mounted thereon and the outer end of sleeve 38 is chamfered inwardly at 39.

A second end plate 40 has a central bore 41 adapted to snugly fit over the outer end of sleeve 38. The outer diameter of end plate 40 is the same as that of end plate 22 and is chamfered in an identical manner at 42 and 43. The outer portion of central bore 41 is chamfered at 44 at the same angle as the end of sleeve 38, so that when the parts of the piston are assembled, chamfered surfaces 39 and 44 will form a continuous face.

A wing nut 45, provided with an inwardly extending hub portion 46, the outer face 47 of which is machined at an angle complementing the angle formed by chamfered surfaces 39 and 44. Wing nut 45 is threaded internally at 48 to engage threads 21 of the piston body.

The piston, in accordance with this invention is assembled and mounted on the piston rod by first sliding piston body 15 on the tapered end 11 of the piston rod and then tightly locking it in place, making up locknuts 13 and 14 tightly against washer 17 which bears on the end of the piston body. Because of the very high pressures and abrasive nature of the fluid handled by slush pumps, it is important that the fit of the piston body on the rod be very tight. With the piston body in place on the rod, the several members of the piston assembly are then mounted on the piston body in the order described above. As previously indicated all of these members of the piston assembly may be slipped on the piston body over the locknuts 13 and 14 and may similarly be removed therefrom without disturbing the locknuts or the piston body. When all of the piston members are in place, wing nut 45 is tightened, clamping the entire assembly tightly together. In this operation the extended hub portion 46, by virtue of its tapered face 47, contacts the chamfered portion 39 of sleeve 38 and the chamfered portion 44 of end plate 40 and the pressure of wing nut 45 is thus exerted against these faces, while the body of wing nut 45 remains out of contact with the adjacent face of end plate 40. This arrangement, plus the use of coarse threads 21, of the "Acme" type, permit wing nut 45 to exert maximum clamping pressure, while, at the same time, permitting it to be easily unscrewed, since there is a minimum area of frictional contact between the adjacent faces of end plate 40 and the body of wing nut 45.

It will also be understood that the thickness of sealing members 27 is normally somewhat greater than the distance between the inner faces of the two end plates and the adjacent faces of reinforcing plate 35. When wing nut 45 is tightened, therefore, the sealing members will be compressed between the reinforcing plate and the opposed end plates, thus making tight leak-proof joints between these members and against the piston body. The grooves 29 and 30 are provided to receive the resulting flow of the material composing the sealing members to thereby prevent distortion of the latter and excessive wear which might result therefrom. The annular space 32 between the edge of the end plates and the lips of the corresponding sealing members, permits a degree of flexing by the latter in response to the fluid pressures exerted against the sealing members and to the pumping movement; which further reduces the amount of wear on the sealing members and permits the latter to at all times remain in close contact with the cylinder liners. The chamfered surfaces provided on the end plates and on the adjacent junctions between the lips 31 and the bodies of the sealing members, reduces greatly the possibility that the lips will crack or break loose from the sealing members as a result of the operation of the piston. The provision of the tapered flanges 36 and 37 on reinforcing plate 35 and the correspondingly chamfered surfaces 34 on the heels of the sealing members reduces wear of the sealing member and further improves the efficiency of the sealing action of the sealing members.

With the described arrangement of the parts of the piston, it will be evident that when any member of the piston assembly becomes worn it may be removed and replaced without disturbing the locknuts on the rod or the piston body and this is an important advantage, since the piston body normally does not wear as rapidly as the sealing members and its removal normally would entail considerable time and labor and would ordinarily require the removal of the piston rod itself in order that suitable tools could be applied to the piston body to effect its removal from the rod. With the arrangement, described, in order to remove the sealing members, it is only necessary to tap the wings of the wing nut or otherwise apply a suitable twisting pressure to them. Use of the coarse threads, 21 enables the wing nut to be quickly and easily unscrewed and the other parts of the piston assembly can be withdrawn simply and easily from the piston body and any worn parts as simply and easily replaced.

It will be understood that various alterations and modifications may be made in the several parts of the device in accordance with this invention without departing from the scope of the appended claims but within the spirit of this invention.

What I claim and desire to secure by Letters Patent is:

1. A piston comprising in combination with a piston rod, a piston body mounted on said rod, said body having an abutment at one end thereof, locking means carried by the piston rod for locking said body on said rod, a piston comprising seal members removably mounted on said body, the outside diameter of said body being such relative to that of said locking means to permit removal of said piston from said body without removal of said locking means from the piston rod, and means independent of said locking means for clamping said piston against said abutment.

2. A piston comprising in combination with a piston rod, a piston body removably mounted on said rod, locking means carried by the piston rod for locking said body on the piston rod, the outside diameter of said body being greater than that of said locking means, said body having an annular flange at one end thereof and a threaded portion at the other end thereof, a piston assembly including a pair of resilient sealing members removably mounted on said body, and a threaded clamping member independent of said locking means engageable with said threaded portion of said body and adapted to compressively clamp said sealing members against said annular flange.

3. A piston comprising in combination with a piston rod, a piston body removably mounted on said rod, locking means carried by the piston rod for locking said body on said piston rod, the outside diameter of said body being greater than that of said locking means, said body having an annular flange at one end thereof, a piston assembly mounted on said body comprising a plurality of separable elements including a pair of resilient sealing members, and a reinforcing plate between said sealing members, all enclosed between a pair of end plates and a clamping member mounted on the opposite end of said body and adapted to compressively clamp said piston assembly against said annular flange, said piston assembly and the separable elements thereof all being removable from said body without removal of said locking means from said piston rod.

4. A piston comprising in combination with a piston rod, a piston body removably mounted on said rod, locking means carried by the piston rod for locking said body on said piston rod, the outside diameter of said body being greater than that of said locking means, said body having an annular flange at one end thereof, a piston assembly mounted on said body comprising a plurality of separable elements including a pair of resilient sealing members, and a reinforcing plate between said sealing members, all enclosed between a pair of end plates, each of said sealing members having a peripheral lip extending over and concentric with the edge of the adjacent end plate and spaced therefrom, and a clamping member mounted on the opposite end of said body and adapted to compressively clamp said piston assembly against said annular flange, said piston assembly and the separable elements thereof all being removable from said body without removal of said locking means from said piston rod.

5. A piston comprising in combination with a piston rod, a piston body removably mounted on said rod, locking means carried by the piston rod for locking said body on said piston rod, the outside diameter of said body being greater than that of said locking means, said body having an annular flange at one end thereof, a piston assembly mounted on said body comprising a plurality of separable elements including a pair of resilient sealing members, a reinforcing plate between said sealing members, said reinforcing plate having peripheral flanges tapering outwardly from the opposite faces of said plate, a pair of end plates enclosing said resilient sealing members and said reinforcing plate therebetween, each of said sealing members having a peripheral lip extending over and concentric with the edge of the adjacent end plate and having a peripherally scarfed surface on the heel thereof complementing the adjacent tapered surface of the flange on the reinforcing plate, and a clamping member mounted on the opposite end of said body and adapted to compressively clamp said piston assembly against said annular flange, said piston assembly and the separable elements thereof all being removable from said body without removal of said locking means from said piston rod.

6. A piston comprising in combination with a piston rod, a piston body removably mounted on said rod, locking means carried by the piston rod for locking said body on said piston rod, the outside diameter of said body being greater than that of said locking means, said body having an annular flange at one end, and a portion of reduced diameter adjacent to the opposite end forming an annular shoulder intermediate to ends of the body, a piston assembly removably mounted on said body comprising a plurality of separable members including an end plate abutting on said annular flange, a reinforcing plate abutting on said annular shoulder, a first resilient sealing member between said end plate and said reinforcing plate, a cylindrical sleeve on said reduced portion of the body abutting said reinforcing plate, a second end plate mounted on said sleeve, a second resilient sealing member mounted on said sleeve between said reinforcing plate and said second end plate, and clamping means independent of said locking means mounted on the end of said body and compressively engaging said second end plate and said sleeve to lock said separable members together and to said body.

7. A piston comprising in combination with a piston rod, a piston body removably mounted on said rod, locking means carried by the piston rod for locking said body on said piston rod, the outside diameter of said body being greater than that of said locking means, said body having an annular flange at one end thereof, and a threaded portion at the other end thereof, a piston assembly including a pair of resilient sealing members removably mounted on said body, and a threaded clamping member independent of said locking means engageable with said threaded portion of said body and having a hub portion extending from its inner face and adapted to compressively clamp said sealing members against said annular flange when said clamping member is made up on said threaded portion of said body.

WILLIAM G. SANDERS.

REFERENCES CITED

The following references are of record in the file of this patent:

UNITED STATES PATENTS

| Number | Name | Date |
| --- | --- | --- |
| 1,796,415 | Tyler | Mar. 17, 1931 |
| 2,188,106 | Caldwell | Jan. 23, 1940 |
| 2,189,839 | Sharp et al. | Feb. 13, 1940 |
| 2,267,882 | Wilson | Dec. 30, 1941 |
| 2,274,927 | Lankford | Mar. 3, 1942 |
| 2,277,501 | Murray | Mar. 24, 1942 |
| 2,306,800 | Caldwell | Dec. 29, 1942 |
| 2,306,838 | Volpin | Dec. 29, 1942 |